(12) United States Patent
Ishikawa

(10) Patent No.: US 8,714,614 B2
(45) Date of Patent: May 6, 2014

(54) INSTRUMENT PANEL

(75) Inventor: Akinori Ishikawa, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 214 days.

(21) Appl. No.: 13/014,023

(22) Filed: Jan. 26, 2011

(65) Prior Publication Data

US 2011/0187145 A1 Aug. 4, 2011

(30) Foreign Application Priority Data

Jan. 29, 2010 (JP) ................................ 2010-018582

(51) Int. Cl.
*B60R 7/06* (2006.01)
*B60K 3/04* (2006.01)
*B62D 25/14* (2006.01)

(52) U.S. Cl.
USPC .................................. 296/37.12; 296/193.02

(58) Field of Classification Search
USPC ............. 296/37.12, 70, 74, 37.8, 37.1, 24.34, 296/193.02
See application file for complete search history.

(56) References Cited

U.S. PATENT DOCUMENTS

| | | | | |
|---|---|---|---|---|
| 2,301,730 A | * | 11/1942 | Mann .......................... | 312/293.2 |
| 2,820,687 A | * | 1/1958 | Waring .......................... | 312/350 |
| 4,902,061 A | * | 2/1990 | Plavetich et al. ........... | 296/37.12 |
| 5,197,775 A | * | 3/1993 | Reeber ....................... | 296/37.12 |
| 5,427,447 A | * | 6/1995 | Satoh .............................. | 312/309 |
| 5,676,216 A | * | 10/1997 | Palma et al. ..................... | 180/90 |
| 6,213,504 B1 | * | 4/2001 | Isano et al. .................... | 280/748 |
| 6,517,139 B2 | * | 2/2003 | Sutou et al. ...................... | 296/70 |
| 6,709,041 B1 | * | 3/2004 | Hotary et al. .................... | 296/70 |
| 6,796,591 B2 | * | 9/2004 | Yanagita ....................... | 296/37.8 |
| 6,843,521 B1 | * | 1/2005 | Oana .............................. | 296/70 |
| 2008/0290682 A1 | * | 11/2008 | Sauer ......................... | 296/37.12 |
| 2009/0295183 A1 | * | 12/2009 | Piekny et al. ................. | 296/37.1 |

FOREIGN PATENT DOCUMENTS

| | | |
|---|---|---|
| EP | 0960785 A2 | 12/1999 |
| JP | 6-037010 U | 5/1994 |
| JP | 09-207680 A | 8/1997 |
| JP | 11-180238 A | 7/1999 |

(Continued)

OTHER PUBLICATIONS

Japanese Office Action dated Aug. 1, 2013, for Japanese Patent Application No. 2010-018582.

(Continued)

*Primary Examiner* — Glenn Dayoan
*Assistant Examiner* — SunSurraye Westbrook
(74) *Attorney, Agent, or Firm* — Lerner, David, Littenberg, Krumholz & Mentlik, LLP

(57) ABSTRACT

An instrument panel allows increase in the strength of supporting a striker, and improvement of the rigidity of an opening part formed in a front wall of an instrument panel body, thereby easily maintaining a constant gap at a joint between the opening part and a glove compartment, even if the instrument panel or the glove compartment is made larger. An opening part is formed in a front wall of an instrument panel body, a glove compartment is provided on a back side of the opening part, a lower end portion of the opening part is fixed to brackets extending from a steering member, a reinforcement including a striker is fixed to a back surface of an upper end portion of the opening part, one end portion, on the inner side of the vehicle interior, of a cover panel that covers an upper portion of an article storage part is fixed to the reinforcement, and an opposite end portion of the cover panel is fixed to the brackets.

7 Claims, 10 Drawing Sheets

(56) References Cited

FOREIGN PATENT DOCUMENTS

| | | |
|---|---|---|
| JP | 2001-071939 A | 3/2001 |
| JP | 2007-191052 A | 8/2007 |
| JP | 2009-012514 A | 1/2009 |
| JP | 2009-061910 A | 3/2009 |

OTHER PUBLICATIONS

German Office Action dated Jan. 31, 2013 for German Patent Application No. 102011010255.8.

Decision of Rejection for Japanese Patent Application No. 2010-018582 dated Dec. 10, 2013.

* cited by examiner

INSTRUMENT PANEL

CROSS-REFERENCE TO RELATED APPLICATIONS

This application claims the benefit of the filing date of Japanese Patent Application No. 2010-018582 filed Jan. 29, 2010, the entire disclosure of which is hereby incorporated herein by reference.

BACKGROUND OF THE INVENTION

1. Field of the Invention

The present invention relates to an instrument panel including an instrument panel body having a front wall on an inner side of a vehicle interior, an opening part formed in the front wall, and a glove compartment provided on a back side of the opening part in the instrument panel body.

2. Description of Related Art

An instrument panel as described above conventionally has a structure as disclosed in JP 9-207680 A. Specifically, a bracket extends toward the inside of a vehicle interior from an instrument-panel support member located on a back side of an instrument panel body. The bracket is fixed to a middle portion, in a front-rear direction, of a cover panel that covers an upper portion of an article storage part. A striker-bracket, which includes a striker for engaging with an engaging portion of a glove compartment, is fixed to the bracket and to an upper surface of the cover panel.

Moreover, multiple ribs are formed at an opening part that is formed in a front wall of the instrument panel body. The ribs engage with a front end portion of the cover panel.

In the conventional structure described above, the striker-bracket is fixed to the bracket. Accordingly, for a large instrument panel that is long in a vehicle front-rear direction, the bracket must be long in the vehicle front-rear direction so that the striker can engage with the engaging portion of the glove compartment. For this reason, the support of the striker by the instrument-panel support member tends to be unstable.

Additionally, the opening part formed in the front wall of the instrument panel body merely has the multiple ribs formed to engage with the front end portion of the cover panel. Accordingly, as a glove compartment is larger, the rigidity of the opening part is reduced, making it difficult to maintain a constant gap at a joint between the opening part and the glove compartment.

SUMMARY OF THE INVENTION

The present invention has been made in view of the above circumferences. An object thereof is to provide an instrument panel that allows increase in the strength of supporting a striker that engages with an engaging portion of a glove compartment, and improvement of the rigidity of an opening part for glove compartment formed in a front wall of an instrument panel body, thereby easily maintaining a constant gap at a joint between the opening part and the glove compartment, even if the instrument panel or the glove compartment becomes larger.

The present invention provides an instrument panel characterized by including: an instrument panel body having a front wall located on an inner side of a vehicle interior, an opening part formed in the front wall, a glove compartment provided on a back side of the opening part in the instrument panel body, a reinforcement including a striker for engaging with an engaging portion of the glove compartment, and a cover panel for covering an upper portion of an article storage part on the back side of the opening part. In this structure, at least one of a pair of side portions and a lower end portion of the opening part are fixed to a bracket extending from a steering member, and the reinforcement is fixed to a back surface of an upper end portion of the opening part. Furthermore, one end portion, on the inner side of the vehicle interior, of the cover panel fixed to the reinforcement, and an opposite end portion of the cover panel is fixed to the bracket.

As described above, at least one of the pair of side portions and the lower end portion of the opening part are fixed to the bracket extending from the steering member, and the reinforcement including the striker that engages with the engaging portion of the glove compartment is fixed to the back surface of the upper end portion of the opening part. Accordingly, the rigidity and the strength of the opening part of the instrument panel body can be improved.

The one end portion, on the inner side of the vehicle interior, of the cover panel that covers the upper portion of the article storage part is fixed to the reinforcement, and the opposite end portion of the cover panel is fixed to the bracket. This enables the steering member to support the opening part through the cover panel. As a result, the rigidity and the strength of the opening part can be improved, and the bracket does not need to extend from the steering member all the way toward the inner side of the vehicle interior. Thus, in comparison with a structure in which a striker is supported by a bracket that extends all the way toward the inner side of the vehicle interior, for example, the strength of the steering member for supporting the striker can be increased.

Additionally, the striker is provided to the reinforcement that improves the rigidity of the opening part as described above. Accordingly, even when the striker is provided at a position far away from the steering member, the strength of supporting the striker can be increased.

Thus, even if the instrument panel or the glove compartment is large, the strength of supporting the striker that engages with the engaging portion of the glove compartment can be increased. Moreover, the rigidity of the opening part for glove compartment formed in the front wall of the instrument panel body can be improved. This allows easily keeping constant the gap at the joint between the opening part and the glove compartment.

According to the present invention, a second article storage part opened toward the inner side of the vehicle interior is formed in the cover panel, and a peripheral portion of an opening part of the second article storage part is fixed to the reinforcement. Accordingly, the cover panel can be utilized as the second article storage part, and thereby the usability of the article storage part in the glove compartment is improved. Moreover, the reinforcement can receive a load applied when an article is put into or out of the second article storage part. Thus, the rigidity and the strength of the opening part of the second article storage part can be improved.

According to the present invention, the cover panel includes, an upper wall, a back wall extending downward from an end portion, on a side opposite to the inner side of the vehicle interior, of the upper wall, and a standing wall standing upward from an end portion, on the inner side of the vehicle interior, of the upper wall. In this structure, the upper wall is provided with a surrounding wall standing upward from the upper wall. Furthermore, the upper wall, the surrounding wall, and the standing wall form the second article storage part, and the opening part of the second article storage part is formed in the standing wall. This structure enables the upper wall and the back wall to cover and hide the inside (the upper side and the back side) of the instrument panel body.

Furthermore, the second article storage part can be made compact, and the structure of the cover panel can be simplified.

According to the present invention, a pair of the brackets are arranged at an interval in a vehicle width direction and extend from the steering member, and two end portions, in the vehicle width direction, of the back wall are respectively fixed to the pair of brackets. Accordingly, the steering member can reliably support the cover panel through the brackets, and the strength of the steering member for supporting the cover panel can be improved.

According to the present invention, the cover panel includes sidewalls respectively extending downward from two end portions, in the vehicle width direction, of the upper wall. In this structure, a space is formed between the back wall and each of the sidewalls, lower end portions of the sidewalls are respectively connected to lower end portions of the end portions, in the vehicle width direction, of the back wall through connection pieces, and the sidewalls are set thinner than the upper wall. Thus, the present invention can yield the following effects.

The cover panel includes the sidewalls respectively extending downward from the two end portions, in the vehicle width direction, of the upper wall. Accordingly, the sidewalls can cover and hide a side of the inside of the instrument panel body. Moreover, the space is formed between the back wall and each of the sidewalls, and the lower end portions of the sidewalls are respectively connected to the lower end portions of the end portions, in the vehicle width direction, of the back wall through the connection pieces. Accordingly, the sidewalls can have an appropriate elasticity. Furthermore, since the sidewalls are set thinner than the upper wall, the rigidity of the sidewalls is low. Accordingly, even if the sidewalls interfere with the opening part during the assembly, the sidewalls can be easily bent. Thus, the assembling operation is facilitated.

According to the present invention, the reinforcement is in the form of a crank having a curved middle portion in a longitudinal direction thereof, and one of a pair of reinforcing portions located on both sides of the curved middle portion, in the longitudinal direction, of the reinforcement is fixed to one of a pair of right and left upper end portions of the opening part, which are partitioned in the vehicle width direction. Furthermore, the other reinforcing portion is located inside the instrument panel body behind the one reinforcing portion, an end portion, on a side opposite to the curved portion, of the other reinforcing portion is fixed to the corresponding side portion of the opening part, and a drawer-type cup holder is fixed to the other upper end portion of the opening part and to the other reinforcing portion. Thus, the present invention can yield the following effects.

The end portion, on the side opposite to the curved portion, of the other reinforcing portion is fixed to the corresponding side portion of the opening part, and the drawer-type cup holder is fixed to the other upper end portion of the opening part and to the other reinforcing portion. Accordingly, the cup holder enables the connection between the instrument panel body and the reinforcement, and this allows disposing the reinforcement in a wider region in the vehicle width direction. This also allows obtaining a synergy effect in that the cup holder improves the rigidity of the upper end portion of the opening part, while the instrument panel body and the reinforcement tightly support the cup holder.

According to the present invention, the cup holder includes a container holder, and a case for storing the container holder in such a manner that the container holder is freely let into and out of the case. In this structure, an upper flange protrudes upward from a front end portion, on the inner side of the vehicle interior, of the case, while a lower flange protrudes downward from a lower wall of the case, the upper flange is fixed to the other upper end portion of the opening part, and the lower flange is fixed to the other reinforcing portion. Thus, the present invention can exert the following effects.

The cup holder can be supported from the upper side and from the lower side by the instrument panel body and the reinforcement, and thus, the cup holder can be stably supported. Moreover, a space required for the supporting structure can be reduced, and the supporting structure for the cup holder can be simplified.

The present invention provides an instrument panel that allows increase in the strength of supporting a striker that engages with an engaging portion of a glove compartment, and improvement of the rigidity of an opening part for glove compartment formed in a front wall of an instrument panel body, thereby easily maintaining a constant gap at a joint between the opening part and the glove compartment, even if the instrument panel or the glove compartment is made larger.

DETAILED DESCRIPTION OF PREFERRED EMBODIMENTS

Hereinbelow, embodiments of the present invention will be described based on the drawings.

Figure 1:
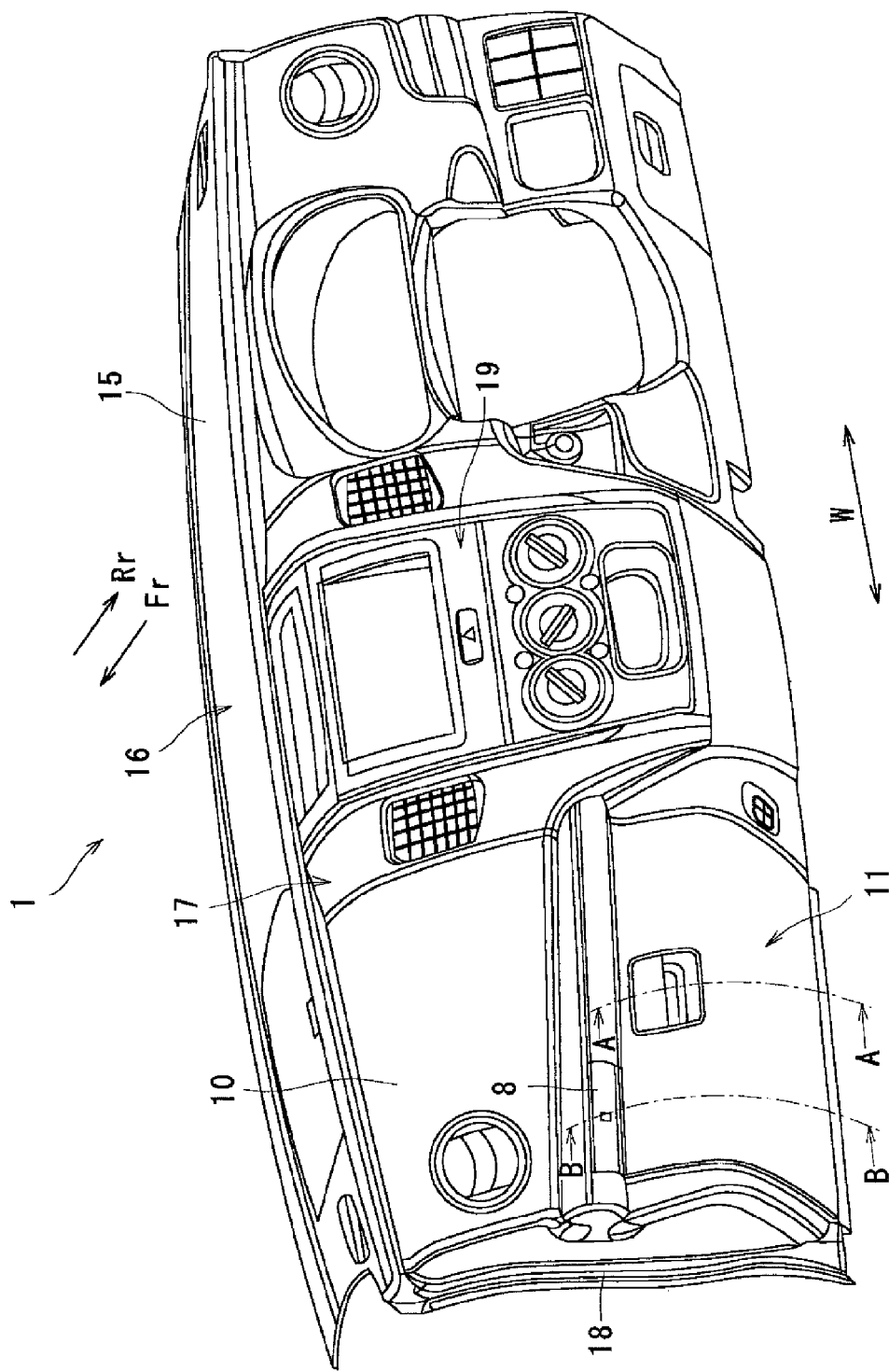
FIG. 1 is a perspective view of an instrument panel.

FIG. 1 shows an instrument panel 1 for an automobile. The instrument panel 1 is an integrated part made of a synthetic resin and attached to front and side portions, in a vehicle interior, of the vehicle. The instrument panel 1 is disposed in front of a driver seat and a passenger seat (not illustrated).

An instrument panel body 15 is set to have a length as long as almost the entire width of the vehicle interior. The instrument panel body 15 includes an upper wall 16, a front wall 17 located on an inner side of the vehicle interior and facing the driver seat and the passenger seat, and a pair of right and left first sidewalls 18. A control panel 19 to collectively control a car audio system, air conditioning, and so forth is provided at a central portion, in a vehicle width direction W, of the front wall 17. A design cover 10 is provided in an upper half of the front wall 17 (specifically, a left-side portion of the front wall 17) facing the passenger seat. The structure maybe provided with an upper box instead of the design cover 10.

A lower half of the front wall 17 facing the passenger seat is in the form of an "L" shape when seen from a right side of the instrument panel 1. In the lower half of the front wall 17, an opening part 20 (see FIG. 4) is formed. The opening part 20 has a rectangular shape when seen from the passenger seat (from a vehicle rear side Rr). On a back side of the opening part 20 in the instrument panel body 15, a glove compartment 11 is provided. The glove compartment 11 is designed to be opened and closed by swinging and is freely let into and out of the opening part 20.

Structure of Opening Part 20

Figure 6:
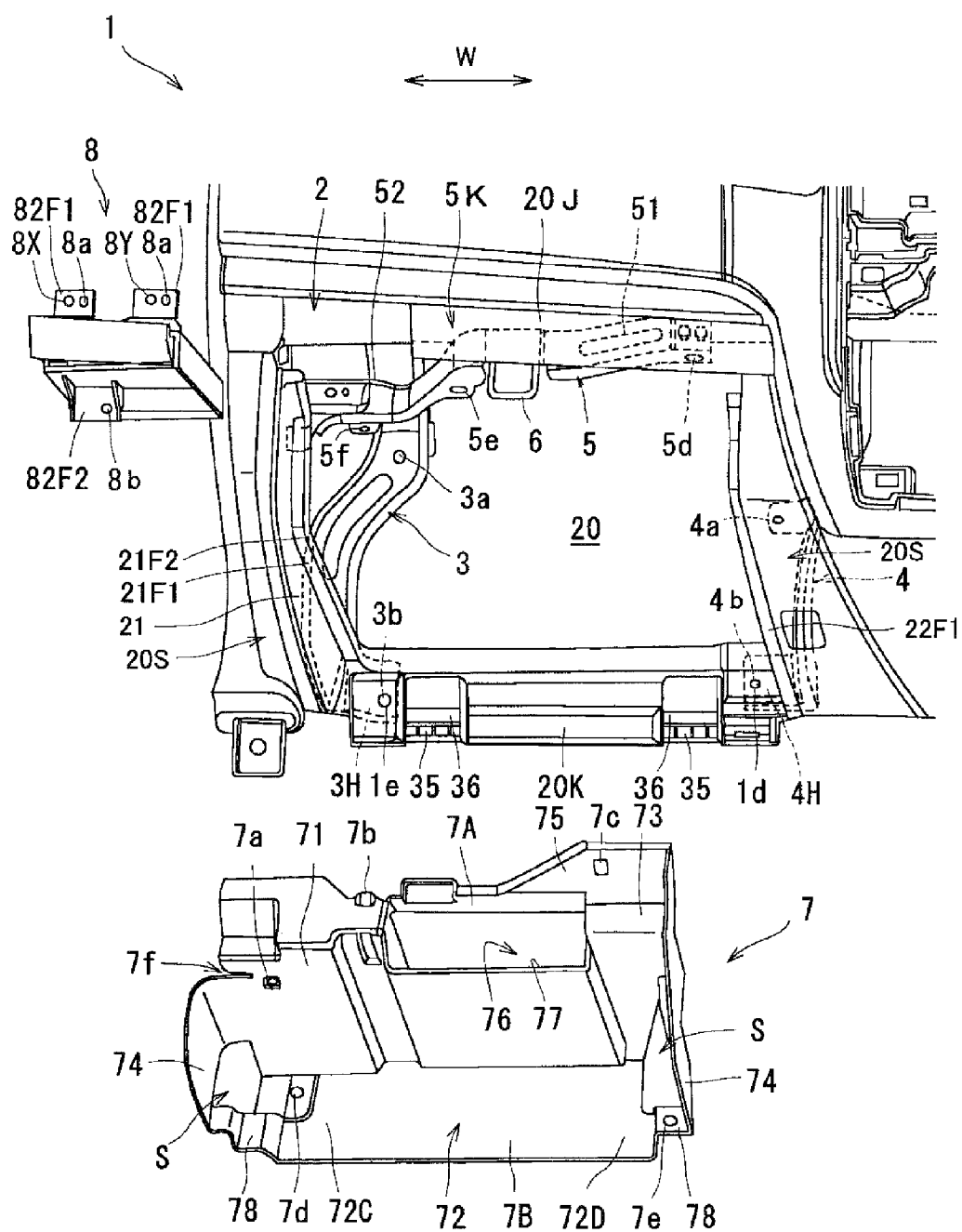
FIG. 6 is an exploded perspective view of the instrument panel, showing a cover panel, a cup holder, and the instrument panel body.
Figure 11:
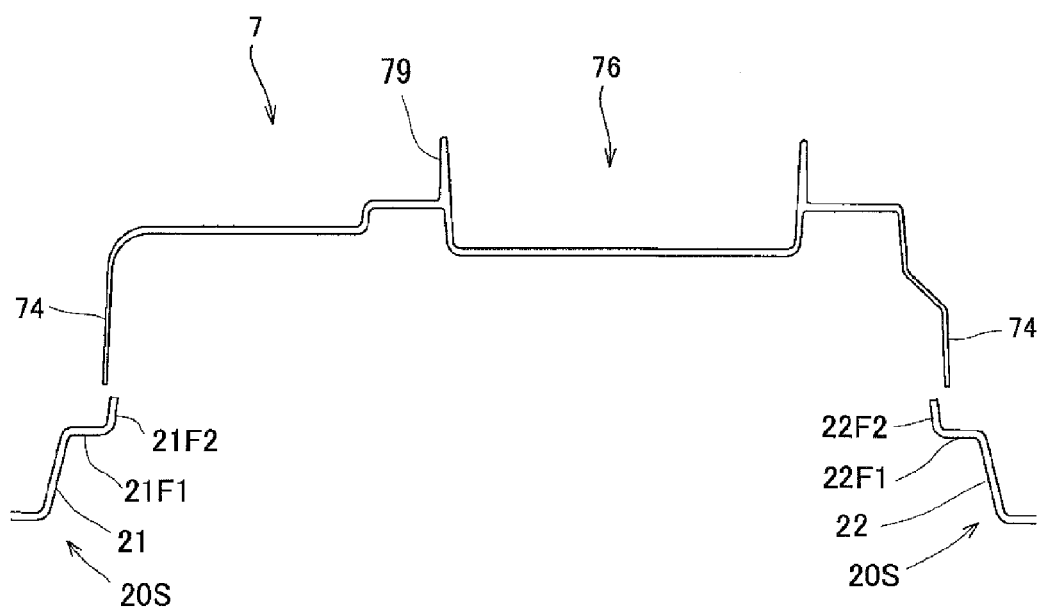
FIG. 11 is a longitudinal cross-sectional view showing side portions of an opening part and the cover panel.

As shown in FIGS. 6 and 11, a left-side folded wall 21 is formed in a left side portion 20S of the opening part 20. The folded wall 21 extends from an opening edge on a left side of the front wall 17 toward a back side (vehicle front side Fr) of the instrument panel body 15. The folded wall 21 faces the left-side first sidewall 18 of the instrument panel body 15 from the right side of the left-side first sidewall 18. Furthermore, a first flange 21F1 protrudes inward in a radial direction of the opening part 20 (rightward) from a tip end portion (i.e., an end portion on the vehicle front side Fr) of the left-side folded wall 21. A second flange 21F2 protrudes toward the back side of the instrument panel body 15 from the first flange 21F1.

Figure 4:
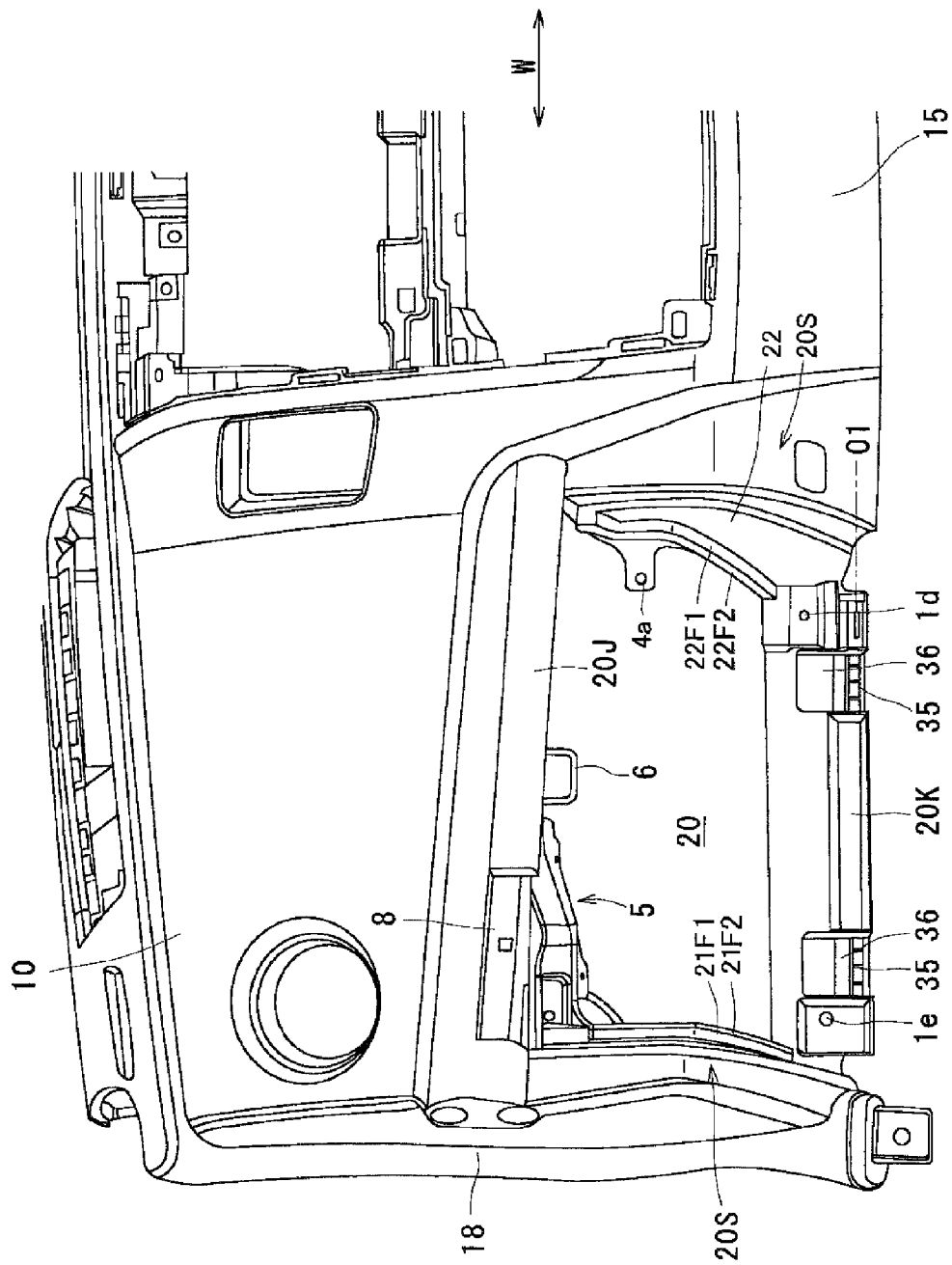
FIG. 4 is a perspective view of the instrument panel before the attachment of the glove compartment.

As shown in FIGS. 4 and 11, a right-side folded wall 22 is formed in a right side portion 20S of the opening part 20. The folded wall 22 extends from an opening edge on a right side of the front wall 17 toward the back side of the instrument panel body 15. Furthermore, a first flange 22F1 protrudes inward in the radial direction of the opening part 20 (leftward) from a tip end portion of the right-side folded wall 22. A second flange 22F2 protrudes toward the back side of the instrument panel body 15 from the first flange 22F1. The tip end portions of the left-side and the right-side folded walls 21, 22 are each in the form of an "L" shape corresponding to the shape of the front wall 17, when seen from the right side of the instrument panel 1.

Figure 5:
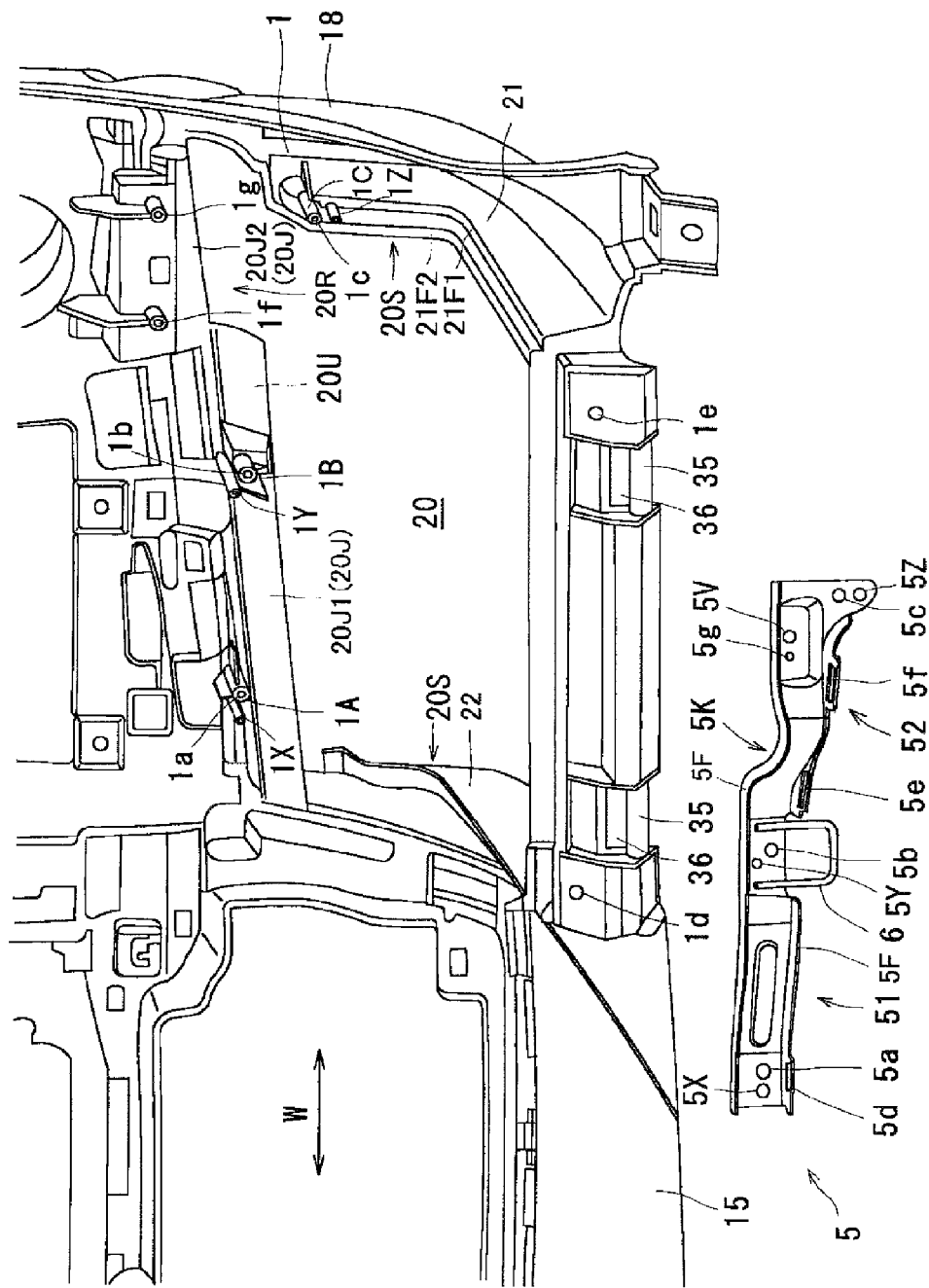
FIG. 5 is an exploded perspective view illustrating how a reinforcement is attached to the instrument panel body (the perspective view seen from a side opposite to the inner side of a vehicle interior).

As shown in FIGS. 4 to 6, a square hole 36 penetrates a lower end portion 20K of the opening part 20, and a pair of right and left shaft parts 35 are formed in the lower end portion 20K of the opening part 20. A notch 20R (see FIG. 5) for storing a front wall portion of a cup holder 8 to be described later is formed on a left-side end portion of an upper end portion 20J of the opening part 20.

Structure of Glove Compartment 11

Figure 7:
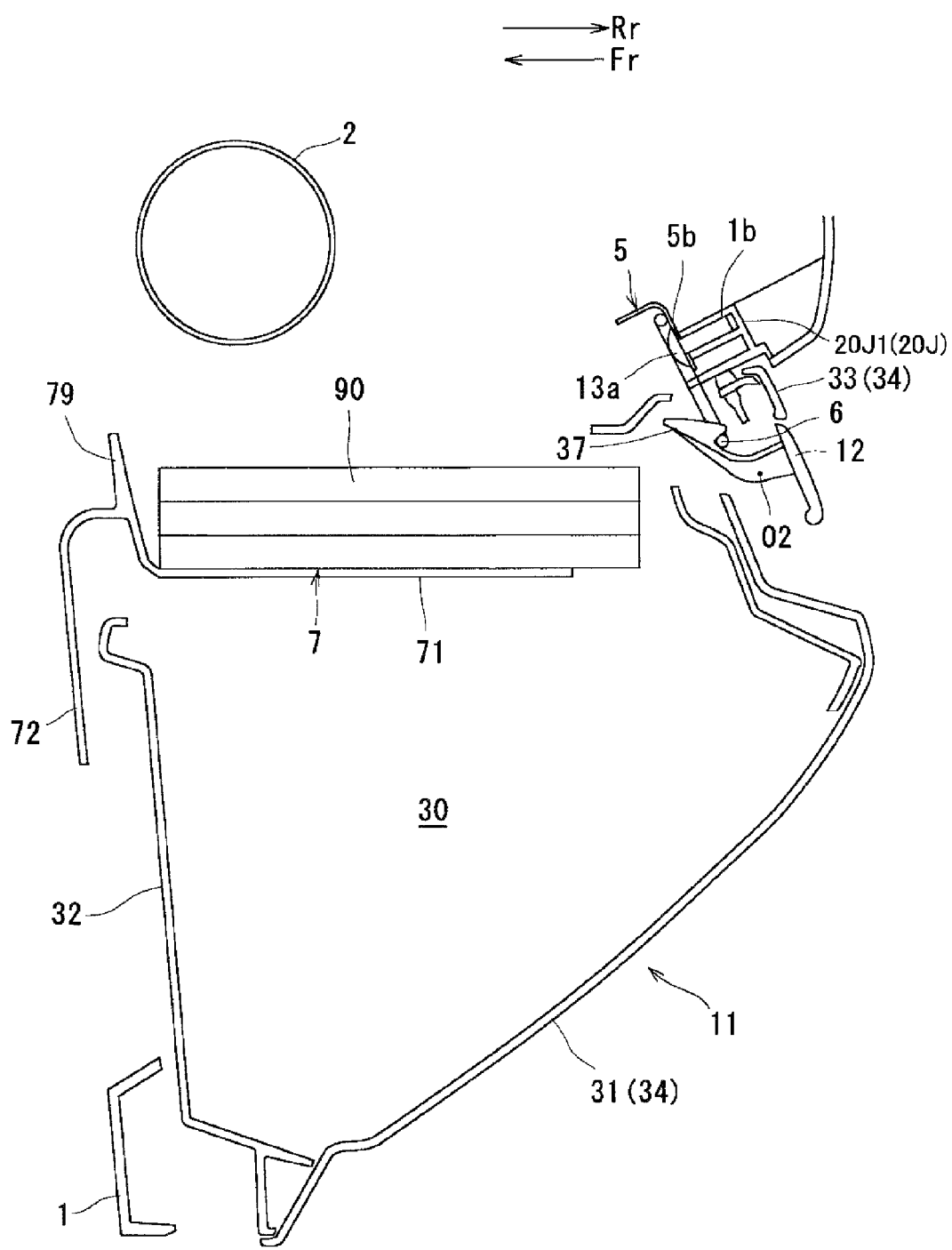
FIG. 7 is a cross-sectional view taken along the line A-A in FIG. 1.
Figure 8:
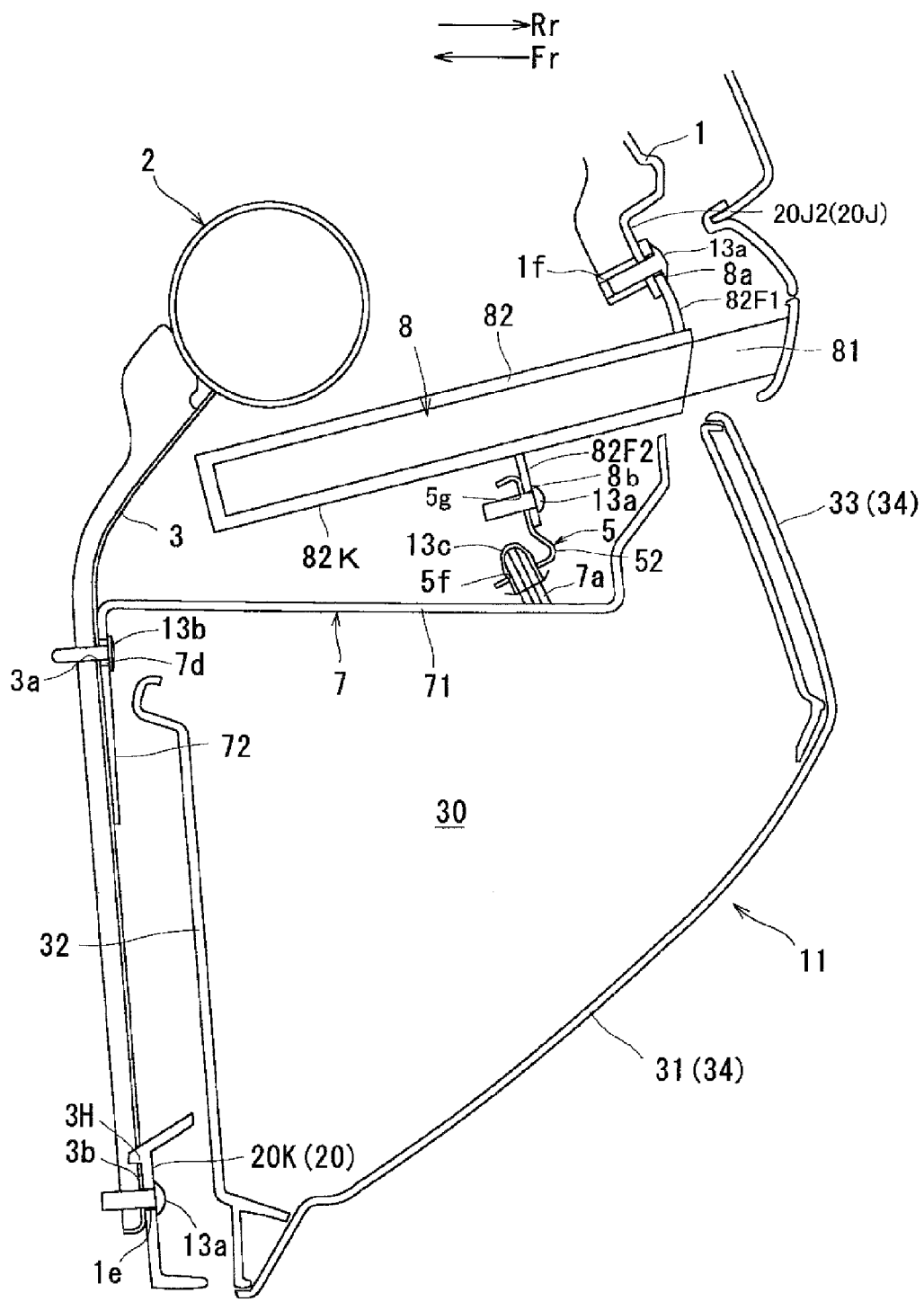
FIG. 8 is a cross-sectional view taken along the line B-B in FIG. 1.
Figure 9:
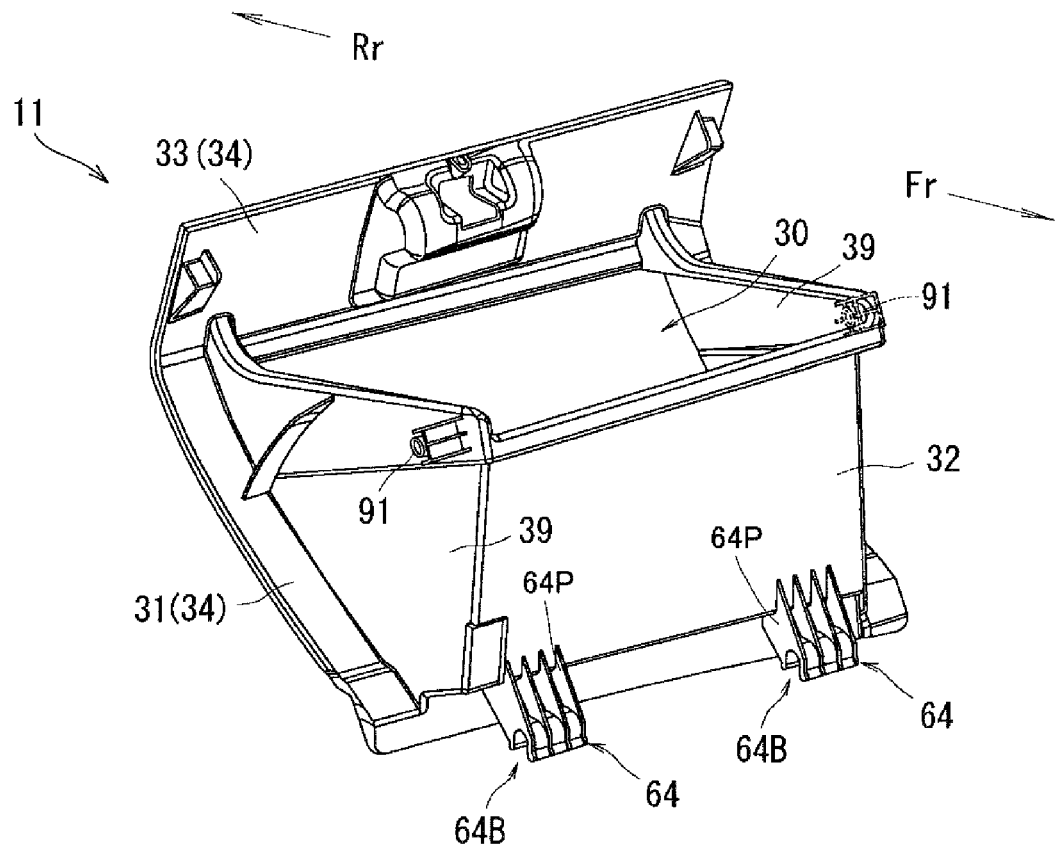
FIG. 9 is a perspective view of the glove compartment.

As shown in FIGS. 7 to 9, the glove compartment 11 includes an article storage part 30 having a V shape in a vertical cross-sectional side view. Third sidewalls 39 are each bridged between a side portion of a first sloping wall 31 extending upward toward the inner side of the vehicle interior (toward the vehicle rear side Rr) and a side portion of a second sloping wall 32 extending upward toward a side opposite to the inner side of the vehicle interior (toward the vehicle front side Fr).

Moreover, a third sloping wall 33 extends upward toward the front from an upper end portion of the first sloping wall 31. A wall 34 constituted of the first sloping wall 31 and the third sloping wall 33 is in the form of an "L" shape corresponding to the shape of the front wall 17, when seen from the right side of the instrument panel 1.

As shown in FIG. 9, a pair of right and left projecting parts 64 projecting downward are formed integrally with lower end portions of the first sloping wall 31 and of the second sloping wall 32. An arc-shaped engagement recessed portion 64B opened downward is formed in each of the projecting parts 64. The projecting part 64 is formed of multiple rib-shaped plate members 64P aligned at an interval in a width direction of the glove compartment 11.

The engagement recessed portions 64B respectively engage with, from the above, the pair of right and left shaft parts 35 (see FIG. 4) formed in the lower end portion 20K of the opening part 20. Thereby, the glove compartment 11 is openable and closable by swinging around a first horizontal axis center O1 of the shaft parts 35.

The L-shaped wall 34 is formed as a lid for the opening part 20. This lid has a large area and thereby secures a large capacity of a storing space. To improve the usability even when the glove compartment 11 is open, the glove compartment 11 is configured to be opened as wide as possible toward the passenger.

In addition, as shown in FIG. 7, a hook 37 (corresponding to an engaging portion) that engages with a striker 6 provided to a reinforcement 5 to be described below is supported at an upper end portion of the third sloping wall 33 to be swingable about a second horizontal axis center O2. The hook 37 is formed integrally with a plate knob 12.

Moreover, a coil spring (not illustrated) is attached to the third sloping wall 33. The coil spring serves as biasing means for biasing the hook 37 to close toward an inner surface of the third sloping wall 33 by swinging. Thereby, a locking mechanism is formed which is capable of keeping the closed state of the glove compartment 11 and releasing the closed state of the glove compartment 11. Specifically, (1) When the passenger closes the opened glove compartment 11, the hook 37 accordingly comes into contact with the striker 6, and is opened downward by swinging about the second horizontal axis center O2 against a biasing force of the coil spring. Then, once the hook 37 rides over the striker 6, the hook 37 is closed upward by swinging due to the biasing force and engages with the striker 6, thus keeping the closed state of the glove compartment 11.

Figure 3:
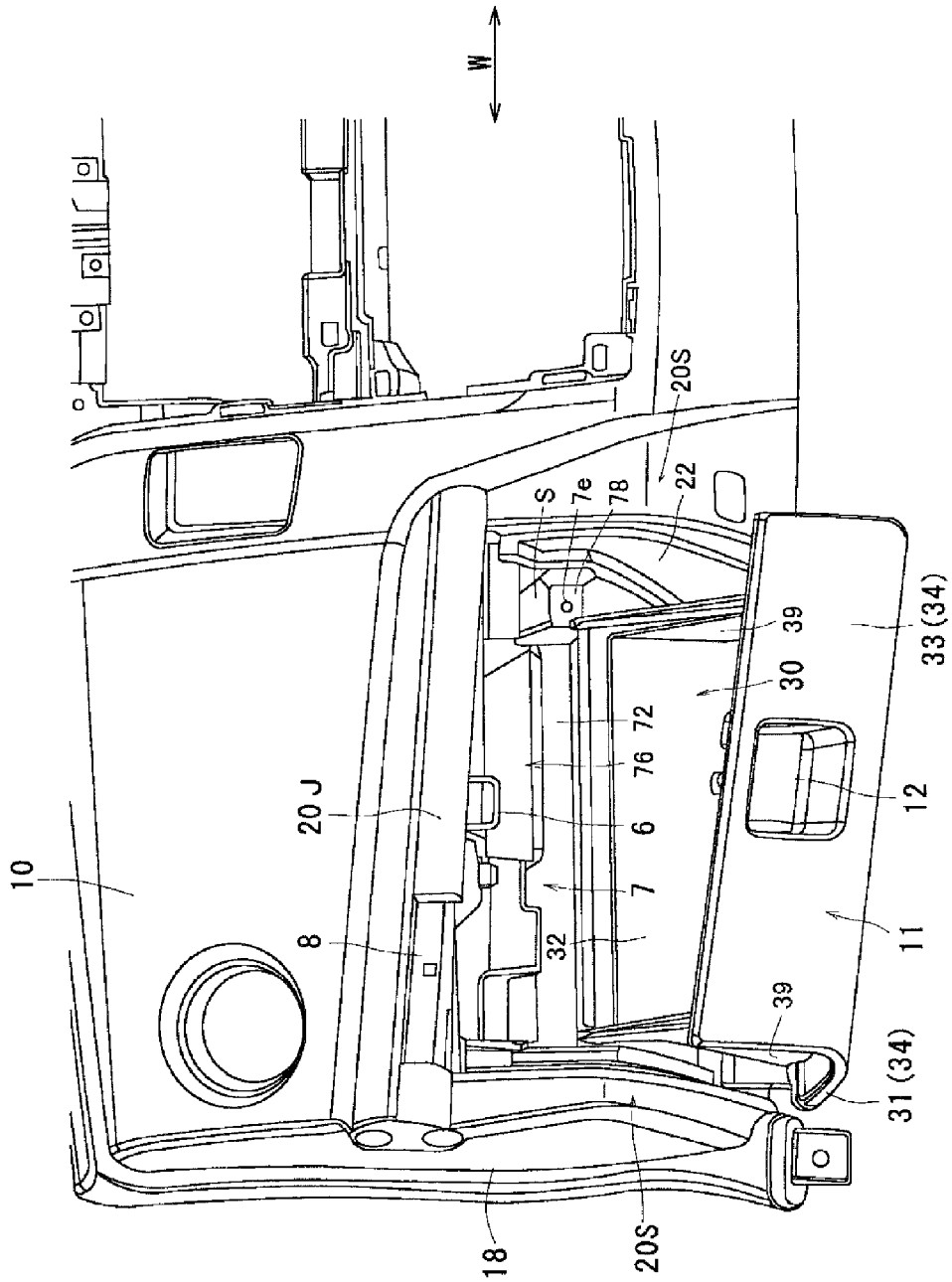
FIG. 3 is a perspective view of the instrument panel with a glove compartment opened.

(2) When the passenger pulls the knob 12 towards the passenger with the glove compartment 11 being closed, the hook 37 is swung downward about the second horizontal axis center O2 to release the engagement with the striker 6. This allows the passenger to open the glove compartment 11 by swinging about the first horizontal axis center O1 (see FIG. 4). FIG. 3 shows the opened state of the glove compartment 11.

Figure 2:
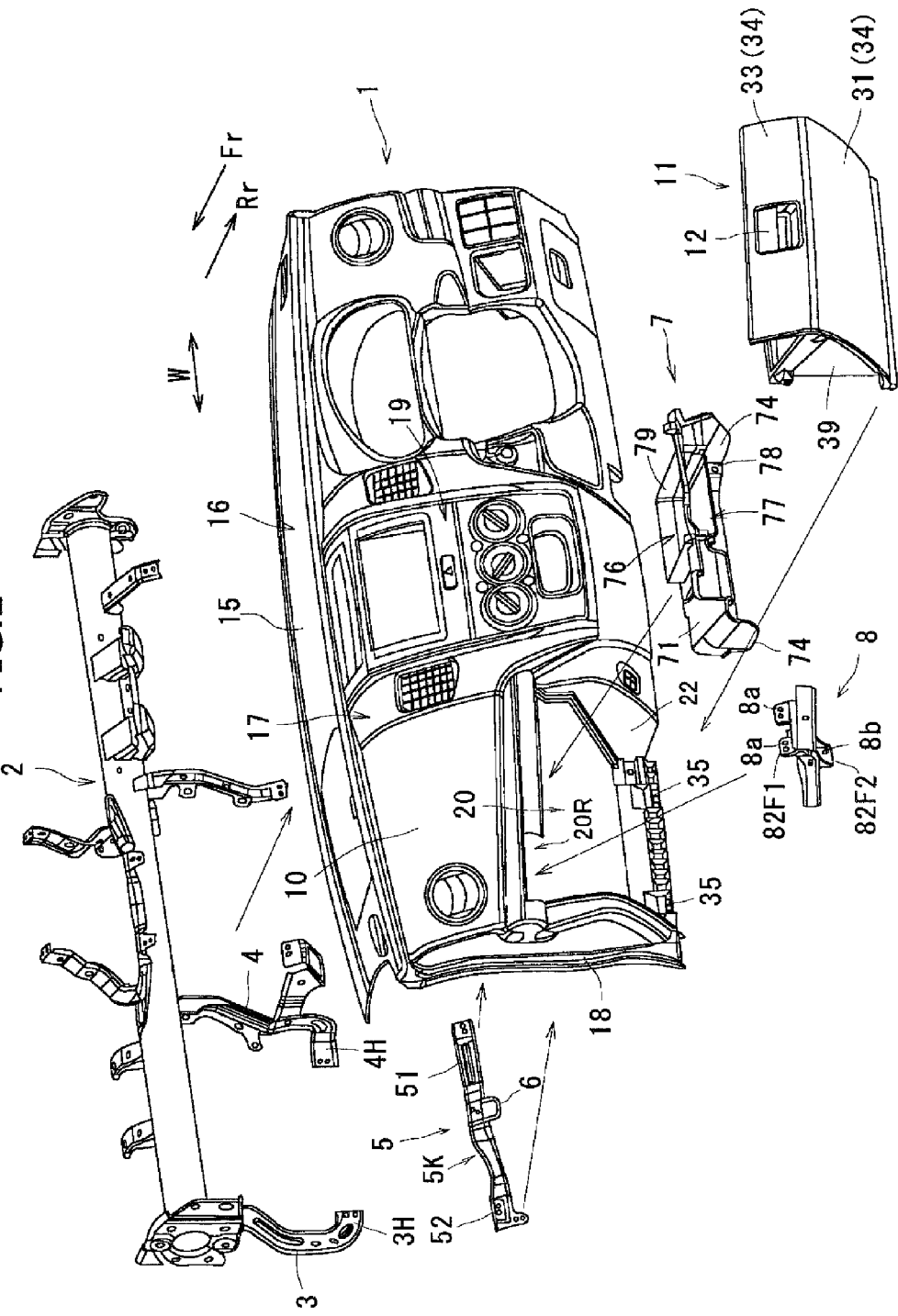
FIG. 2 is an exploded perspective view showing the instrument panel and a steering member.

As shown in FIG. 2, a round pipe-shaped metallic steering member 2 that supports a steering system is disposed at the vehicle front side Fr of the instrument panel 1. A pair of right and left brackets 3, 4 each having a strip shape are located at an interval in a longitudinal direction (vehicle width direction W) of the steering member 2. The brackets 3, 4 are weld-fixed to a left end portion of the steering member 2 and extend downward from the steering member 2.

As shown in FIGS. 2, 6, and 8, lower end portions of the pair of right and left brackets 3, 4 extending from the steering member 2 are bent inward in a width direction of the opening part 20, thereby forming connecting portions 3H, 4H. Female screw portions 3b, 4b are formed in the connecting portions 3H, 4H (see FIG. 8).

Screw insertion holes 1d, 1e are formed in two end portions of the lower end portion 20K of the opening part 20. The two end portions having the screw insertion holes 1d, 1e overlap, from the inner side of the vehicle interior, with the pair of connecting portions 3H, 4H, respectively. Screws 13a inserted in the screw insertion holes 1d, 1e are respectively screwed in the female screw portions 3b, 4b. Thereby, the connecting portions 3H, 4H are fastened and fixed to the two end portions of the lower end portion 20K of the opening part 20 (see FIG. 8). Thus, the instrument panel 1 is connected to and supported by the vehicle body through the brackets 3, 4 and the steering member 2 that is the support member of the brackets 3, 4.

Structure of Reinforcement 5

As shown in FIGS. 2, 5, and 6, the reinforcement 5 including the striker 6 for engaging with the hook 37 is fixed to a back surface 20U of the upper end portion 20J of the opening part 20. Reinforcing flanges 5F (see FIG. 5) are formed on both upper and lower end portions of the reinforcement 5. The reinforcement 5 is in the form of a U shape in the horizontal cross section.

The reinforcement 5 is metallic and in the form of a crank having a curved middle portion in a longitudinal direction thereof. A pair of reinforcing portions 51, 52 are located with the curved portion 5K of the reinforcement 5 interposed therebetween. The one reinforcing portion 51 is fixed to one upper end portion 20J1 (a right-side upper end portion) of a pair of right and left upper end portions 20J1, 20J2 of the opening part 20, which are partitioned in the vehicle width direction W (see FIG. 5).

The other reinforcing portion 52 is located inside the instrument panel body 15 behind the one reinforcing portion 51. An end portion (left end portion), on a side opposite to the curved portion 5K, of the other reinforcing portion 52 is fixed to the left side portion 20S of the opening part 20.

Specifically, as shown in FIG. 5, multiple bosses 1A, 1B located at an interval in the vehicle width direction W project from a back surface of the one upper end portion 20J1. Screw holes 1a, 1b are formed in the bosses 1A, 1B, respectively. Multiple screws 13a (see FIG. 7) are respectively inserted in multiple screw insertion holes 5a, 5b formed in the one reinforcing portion 51, and are then respectively screwed in the screw holes 1a, 1b. Thereby, the one reinforcing portion 51 is fixed to the one upper end portion 20J1 of the opening part 20.

Furthermore, a pair of boss insertion holes 5X, 5Y, respectively adjacent to the multiple screw insertion holes 5a, 5b, are formed in the one reinforcing portion 51. A pair of second bosses 1X, 1Y, respectively adjacent to the multiple bosses 1A, 1B, project from the back surface of the one upper end portion 20J1. The pair of second bosses 1X, 1Y are inserted in the pair of boss insertion holes 5X, 5Y, respectively. Thus, by first inserting the pair of second bosses 1X, 1Y into the pair of boss insertion holes 5X, 5Y, respectively, the screw holes 1a, 1b in the bosses 1A, 1B are automatically aligned with the multiple screw insertion holes 5a, 5b. Accordingly, the fastening operation is facilitated.

Moreover, the one reinforcing portion 51 can be tightly fixed to the one upper end portion 20J1 of the opening part 20.

The end portion, on the side opposite to the curved portion 5K, of the other reinforcing portion 52 is also fixed to the left side portion 20S of the opening part 20 by the same means. Specifically, as shown in FIG. 5, a boss 1C projects from a back surface of the first flange 21F1 that protrudes toward the inside of the opening part 20 from an end portion of the left-side folded wall 21 of the opening part 20. A screw hole is formed in the boss 1C. A screw 13a is inserted in a screw insertion hole 5c that is formed in the end portion, on the side opposite to the curved portion 5K, of the other reinforcing portion 52. The screw 13a is screwed in the screw hole 1c in the boss 1C. Thereby, the other reinforcing portion 52 is fixed to the side portion 20S of the opening part 20.

Furthermore, a boss insertion hole 5Z adjacent to the screw insertion hole 5c is formed in the other reinforcing portion 52. A second boss 1Z adjacent to the boss 1C projects from the back surface of the first flange 21F1. The second boss 1Z is inserted in the boss insertion hole 5Z. Thus, by first inserting the second boss 1Z into the boss insertion hole 5Z, the screw hole 1c in the boss 1C is automatically aligned with the screw insertion hole 5c. Accordingly, the fastening operation is facilitated. Moreover, the other reinforcing portion 52 can be tightly fixed to the side portion 20S of the opening part 20.

The striker 6 is formed of a U-shaped metallic round rod. Two upper end portions of the striker 6 are weld-fixed to a central portion, in a longitudinal direction, of the reinforcement 5, to be more specific, to a portion of the one reinforcing portion 51 near the curved portion 5K.

By weld-fixing the striker 6 to the reinforcement 5, the striker 6 can be tightly integrated with the reinforcement 5. As a result, the striker 6 can stably engage with the hook 37, the closed state of the glove compartment 11 can be reliably maintained, and matching of the designs of the instrument panel 1 and the glove compartment 11 can be simplified.

Structure of Cover Panel 7 and Attachment Structure of Cover Panel 7

As described above, the instrument panel 1 of the present invention is designed in such a way that the glove compartment 11 is opened as wide as possible toward the passenger to improve the usability even when the glove compartment 11 is open. Nevertheless, while the glove compartment 11 is wide open, the inside of the instrument panel 1 is easily seen by the passenger in the vehicle interior through the opening part 20 for the glove compartment 11.

In particular, an operation hole needs to be formed in an upper surface (top portion) of the opening part 20 for an operation such as wiring to the HVAC (Heating Ventilating Air-Conditioning) unit inside the instrument panel 1. Accordingly, if the inside of the instrument panel 1 is seen through this operation hole, this may deteriorate the appearance of the inside of the vehicle interior. For this reason, a cover panel 7 is disposed to an inner upper surface of the instrument panel 1 to cover an upper portion of the article storage part 30, thereby preventing the operation hole from being seen from the inside of the vehicle interior.

As shown in FIGS. 2 and 6 to 8, the cover panel 7 includes an upper wall 71; a back wall 72 extending downward from an end portion, on the side opposite to the inner side of the vehicle interior, of the upper wall 71; a standing wall 73 standing upward from an end portion, on the inner side of the vehicle interior, of the upper wall 71; and second sidewalls 74 extending downward from two end portions, in a width direction, of the upper wall 71. An attachment flange 75 extends toward the inner side of the vehicle interior from an upper end portion of the standing wall 73.

A second article storage part 76 opened toward the inner side of the vehicle interior is formed in the cover panel 7. Specifically, a surrounding wall 79 (see FIG. 2) having a U shape in the horizontal cross section stands on the upper wall 71. The upper wall 71, the surrounding wall 79, and the standing wall 73 form the second article storage part 76. A rectangular opening part 77 of the second article storage part 76 is formed in the standing wall 73.

In this embodiment, the second article storage part 76 is formed as an article storage part for storing a stack of several CDs 90 (see FIG. 7). The second article storage part 76 can store other articles. The second article storage part 76 may be formed as a storage part for articles other than CDs. By utilizing the cover panel 7 as the second article storage part in this manner, the usability of the article storage part 30 in the glove compartment 11 can be improved.

The distance between the pair of right and left second sidewalls 74 is set wider than the interval between a pair of right and left opening edges of the opening part 20 (see FIG. 11). With the cover panel 7 being assembled in the instrument panel body 15, stoppers 91 (see FIG. 9) of the glove compartment 11 move inside the pair of right and left second sidewalls 74 in accordance with the opening and closing of the glove compartment 11. When the glove compartment 11 is fully opened, the stoppers 91 come into contact with the second flanges 21F2, 22F2 of the opening part 20. This inhibits the glove compartment 11 from further opening. The second sidewalls 74 extend across the entire trajectory of the stoppers 91, and extend outward of the opening part 20 to cover the opening part 20. This improves the covering performance without impairing the movement of the glove compartment 11.

As shown in FIG. 6, a space S is formed between the back wall 72 and each of the second sidewalls 74. A lower end portion of one of the second sidewalls 74 is connected to a lower end portion of a left end portion 72C of the back wall 72 through a connection piece 78, and a lower end portion of the other second sidewall 74 is connected to a lower end portion of a right end portion 72D of the back wall 72 through another connection piece 78. The second sidewalls 74 are set thinner than the upper wall 71 (see FIG. 11).

Thereby, the second sidewalls 74 have an appropriate elasticity. Since the second sidewalls 74 are set thinner than the upper wall 71, the rigidity of the second sidewalls 74 is low. Accordingly, even if the second sidewalls 74 interfere with the opening part 20 during the assembly, the second sidewalls 74 can be easily bent. Thus, the assembling operation is facilitated. In addition, after the assembly, the second sidewalls 74 are recovered by the elasticity thereof. Accordingly, the second sidewalls 74 can cover the opening part 20 from the outside while securing the moving space of the stoppers 91 of the glove compartment 11, thus achieving the covering structure with high covering performance.

One end portion 7A, on the inner side of the vehicle interior, of the cover panel 7 is fixed to the reinforcement 5 to be attachable to and detachable from the reinforcement 5. An opposite end portion 7B of the cover panel 7 is fixed to the brackets 3, 4 to be attachable to and detachable from the brackets 3, 4. In this manner, the periphery of the opening part 20 for the glove compartment 11 is supported by the steering member 2 through the cover panel 7.

To be more specific, multiple engagement tab portions 7b, 7c to engage with the reinforcement 5 are disposed in a dispersed manner around the opening part 77 of the second article storage part 76. The first engagement tab portion 7c of the multiple engagement tab portions 7b, 7c is formed on the attachment flange 75 in such a way that the first engagement tab portion 7c is located at a side of the opening part 77 of the second article storage part 76.

The second engagement tab portion 7b is formed on the end portion, on the inner side of the vehicle interior, of the upper wall 71 in such a way as to be located on the side opposite to the first engagement tab portion 7c with the opening part 77 of the second article storage part 76 interposed therebetween. In this manner, the peripheral portion of the opening part 77 of the second article storage part 76 is fixed to the reinforcement 5. Furthermore, a third engagement tab portion 7a is formed on a corner portion that is formed of the left end portion and the front end portion of the upper wall 71. The engagement tab portions 7a, 7b, 7c are formed to extend upward toward the vehicle front side Fr (see FIG. 8).

Meanwhile, as shown in FIG. 5, multiple engagement holes 5d, 5e, 5f are formed in the one reinforcing portion 51 and the other reinforcing portion 52. As shown in FIGS. 6 and 8, the engagement tab portions 7c, 7b, 7a located on the one end portion 7A of the cover panel 7 are inserted in and engage with the engagement holes 5d, 5e, 5f in the reinforcement 5, respectively, in such a way that the engagement tab portion 7a is releasable with a clip 13c. Thereby, the one end portion 7A, on the inner side of the vehicle interior, of the cover panel 7 is fixed to the reinforcement 5 to be attachable to and detachable from the reinforcement 5.

As described above, the peripheral portion of the opening part 77 of the second article storage part 76 is fixed to the reinforcement 5. Thereby, the reinforcement 5 can receive a load applied when an article is put into or out of the second article storage part 76. Thus, the rigidity and the strength of the opening part 77 of the second article storage part 76 can be improved.

In addition, as shown in FIGS. 6 and 8, a clip insertion hole 7d is formed in an upper end portion of the left end portion 72C of the back wall 72. A clip insertion hole 7e is formed in the connection piece 78 through which the lower end portion of the second sidewall 74 is connected to the lower end portion of the right end portion 72D of the back wall 72.

A clip 13b (see FIG. 8) is inserted in the clip insertion hole 7d formed in the upper end portion of the left end portion 72C of the back wall 72, and in a clip insertion hole 3a formed in the one bracket 3 of the steering member 2. Thereby, the upper end portion of the left end portion 72C of the back wall 72 is fixed to the one bracket 3 to be attachable to and detachable from the bracket 3.

Furthermore, another clip 13b is inserted in the clip insertion hole 7e formed in the connection piece 78, and in a clip insertion hole 4a formed in the other bracket 4 of the steering member 2. Thereby, the lower end portion of the right end portion 72D of the back wall 72 is fixed to the other bracket 4 to be attachable to and detachable from the bracket 4.

In this manner, the two end portions 72c, 72d, in the vehicle width direction, of the back wall 72 are respectively fixed to the pair of brackets 3, 4. Thus, an upper end portion of the opening part 20 is supported with sufficient strength through the cover panel 7.

The cover panel 7 is attached from the inner side of the vehicle interior later (i.e., after the instrument panel body 15 is attached to the vehicle body, the cover panel 7 is attached to the instrument panel body 15). Thereby, the opening part 20 can be secured as an operation hole for mounting and attaching an instrument panel module to the vehicle. Thus, wiring to the HVAC unit and the like can be easily performed before the cover panel 7 is attached. Moreover, since it is not necessary to open an operation hole in the cover panel 7 for the wiring, the structure with high covering performance can be obtained.

Figure 10:
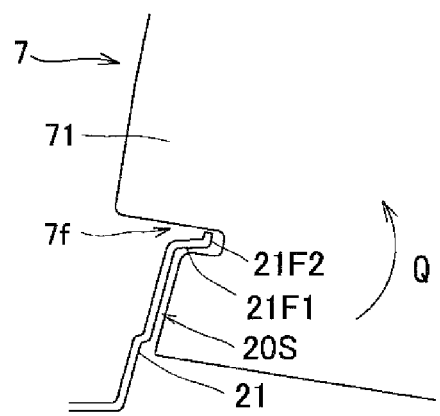
FIG. 10 is a plan view illustrating how the cover panel is attached.

As shown in FIGS. 6 and 10, a notch 7f is formed in an end portion (left end portion), in a width direction, of the cover panel 7. The cover panel 7 can be attached by being turned in a direction from the inner side of the vehicle interior to a side opposite to the inner side of the vehicle interior (i.e., in the direction of the arrow Q in FIG. 10), while the notch 7f is fitted onto the first flange 21F1 and the second flange 21F2 of the side portion 20S of the opening part 20. Thus, the assembling performance of the cover panel 7 can be improved.

Specifically, the cover panel 7 can be attached to the instrument panel body 15 while the notch 7f is hooked on the instrument panel 1 (the first flange 21F1 and the second flange 21F2) and the second sidewall 74 is easily deformed. This allows providing the cover panel structure with higher covering performance such that the inside of the instrument panel 1 can be covered and hidden.

With the above-described structure, the cover panel 7 prevents a built-in component, such as the HVAC unit, inside the instrument panel body 15 from been seen when the glove compartment 11 is opened. Moreover, the structure allows the opening part 20 or the glove compartment 11 to have a larger capacity and allows the glove compartment 11 to have a larger design surface.

Furthermore, the reinforcement 5 including the striker 6 is fixed to the back surface 20U of the upper end portion 20J of the opening part 20. The one end portion 7A, on the inner side of the vehicle interior, of the cover panel 7 covering the upper portion of the article storage part 30 is fixed to the reinforcement 5. The opposite end portion 7B of the cover panel 7 is fixed to the brackets 3, 4. Accordingly, the supporting rigidity of the cover panel 7 can be improved.

As a result, the rigidity and the strength of the opening part 20 can be improved, and the brackets 3, 4 do not need to extend from the steering member 2 all the way toward the inner side of the vehicle interior. Thus, in comparison with a structure in which a striker is supported by a bracket that extends all the way toward the inner side of the vehicle interior, for example, the strength of the steering member 2 for supporting the striker 6 can be increased.

Specifically, the reinforcement 5 fixed to the upper end portion 20J of the opening part 20 and the pair of right and left brackets 3, 4 extending from the steering member 2 are connected to each other in the form of an inverted U shape through the cover panel 7. This structure provides a high rigidity to the opening part 20, thereby reducing the distortion and deformation. The striker 6 is provided to the reinforcement 5 that improves the rigidity of the opening part 20 in the above-described manner. Accordingly, even when the striker 6 is provided at a position far away from the steering member 2, the strength of the steering member 2 for supporting the striker 6 can be increased.

Cup Holder 8 and Attachment Structure of Cup Holder 8

As shown in FIGS. 2, 3, 6, and 8, the drawer-type cup holder 8 is fixed to the other reinforcing portion 52 and to the other upper end portion 20J2 of the opening part 20. In other words, the reinforcement 5 is fixed to the instrument panel body 15 through the cup holder 8.

The cup holder 8 is made of a resin, and includes a container holder 81 for holding a container, and a case 82 for storing the container holder 81 so that the container holder 81 can be freely let into and out of the case 82. Moreover, upper flanges 82F1 protrude upward from a front end portion, on the inner side of the vehicle interior, of the case 82. A lower flange 82F2 protrudes downward from a middle portion, in a front-rear direction, of a lower wall 82K (an upper half of the lower wall 82K) of the case 82. The upper flanges 82F1 are fixed to the other upper end portion 20J2 of the opening part 20 (see FIGS. 5 and 8). The lower flange 82F2 is fixed to the other reinforcing portion 52 (see FIGS. 5 and 8).

Multiple screw insertion holes 8a are formed in the upper flanges 82F1. Screws 13a inserted in the screw insertion holes 8s are screwed in screw holes 1f, 1g that are formed in the other upper end portion 20J2 of the opening part 20 (see FIGS. 5 and 8). A screw insertion hole 8b is formed in the lower flange 82F2. A screw 13a inserted in the screw insertion hole 8b is screwed in a female screw portion 5g that is formed in the other reinforcing portion 52.

Furthermore, multiple boss insertion holes 8X, 8Y, respectively adjacent to the multiple screw insertion holes 8a, are formed in the upper flanges 82F1. Multiple bosses projecting from the other upper end portion 20J2 of the opening part 20 are respectively inserted in the multiple boss insertion holes 8X, 8Y. Thus, by first inserting the multiple bosses respectively into the multiple boss insertion holes 8X, 8Y, the screw holes 1f, 1g are automatically aligned with the screw insertion holes 8a. Accordingly, the fastening operation is facilitated.

Moreover, the upper flanges 82F1 can be tightly fixed to the other upper end portion 20J2 of the opening part 20.

Meanwhile, a boss (not illustrated) adjacent to the screw insertion hole 8b is formed at the lower flange 82F2 to project toward the side opposite to the vehicle interior. A boss insertion hole 5V adjacent to the female screw portion 5g is formed in the other reinforcing portion 52 (see FIG. 5). The boss at the lower flange 82F2 is inserted in the boss insertion hole 5V of the other reinforcing portion 52. Thus, by first inserting the boss into the boss insertion hole 5V, the female screw portion 5g is automatically aligned with the screw insertion hole 8b. Thus, the fastening operation is facilitated. Moreover, the lower flange 82F2 can be tightly fixed to the other reinforcing portion 52.

Since the drawer-type cup holder 8 is fixed to the other reinforcing portion 52 and to the other upper end portion 20J2 of the opening part 20, the instrument panel body 15 and the reinforcement 5 can be connected to each other through the cup holder 8. This allows disposing the reinforcement 5 in a wider region in the vehicle width direction. This also allows obtaining a synergy effect in that the cup holder 8 improves the rigidity of the upper end portion 20J of the opening part 20, while the instrument panel body 15 and the reinforcement 5 tightly support the cup holder 8.

Other Embodiments (1) Both of the side portions 20S of the opening part 20 may be fixed to the brackets 3, 4 extending from the steering member 2.

(2) Both of the side portions 20S and the lower end portion 20K of the opening part 20 may be both fixed to the brackets 3, 4 extending from the steering member 2.

DESCRIPTION OF REFERENCE SYMBOLS

2 STEERING MEMBER
3, 4 BRACKET
5 REINFORCEMENT
5K CURVED PORTION
6 STRIKER
7 COVER PANEL
7A ONE END PORTION, ON INNER SIDE OF VEHICLE INTERIOR, OF COVER PANEL
7B OPPOSITE END PORTION OF COVER PANEL
8 CUP HOLDER
11 GLOVE COMPARTMENT
15 INSTRUMENT PANEL BODY
17 FRONT WALL
18 SIDEWALL (FIRST SIDEWALL, SIDEWALL OF INSTRUMENT PANEL BODY)
20 OPENING PART (OPENING PART OF INSTRUMENT PANEL BODY)
20J UPPER END PORTION OF OPENING PART
20J1 UPPER END PORTION (ONE UPPER END PORTION)
20J2 UPPER END PORTION (OTHER UPPER END PORTION)
20K LOWER END PORTION (LOWER END PORTION OF OPENING PART)
20S SIDE PORTION (SIDE PORTION OF OPENING PART)
20U BACK SURFACE OF UPPER END PORTION OF OPENING PART
30 ARTICLE STORAGE PART
37 ENGAGING PORTION (HOOK)

51 REINFORCING PORTION (ONE REINFORCING PORTION)
52 REINFORCING PORTION (OTHER REINFORCING PORTION)
71 UPPER WALL
72 BACK WALL
72C, 72D TWO END PORTIONS, IN VEHICLE WIDTH DIRECTION, OF BACK WALL
73 STANDING WALL
74 SIDEWALL (SECOND SIDEWALL, SIDEWALL OF COVER PANEL)
76 SECOND ARTICLE STORAGE PART
77 OPENING PART (OPENING PART OF SECOND ARTICLE STORAGE PART)
78 CONNECTION PIECE
79 SURROUNDING WALL
81 CONTAINER HOLDER
82 CASE
82F1 UPPER FLANGE
82F2 LOWER FLANGE
82K LOWER WALL OF CASE
S SPACE
W VEHICLE WIDTH DIRECTION

What is claimed is:

1. An instrument panel comprising:
an instrument panel body having a front wall located on an inner side of a vehicle interior,
an opening part formed in the front wall;
a glove compartment provided on a back side of the opening part in the instrument panel body;
a reinforcement including a striker for engaging with an engaging portion of the glove compartment; and
a cover panel for covering an upper portion of an article storage part on the back side of the opening part,
wherein the cover panel prevents a built-in component inside the instrument panel body from been seen from the vehicle interior when the glove compartment is opened, at least one of a pair of side portions and a lower end portion of the opening part are fixed to a bracket extending from a steering member,
the reinforcement is fixed to a back surface of an upper end portion of the opening part,
one end portion, on the inner side of the vehicle interior, of the cover panel is fixed to the reinforcement, and
an opposite end portion of the cover panel is fixed to the bracket.

2. The instrument panel according to claim 1, wherein
a second article storage part opened toward the inner side of the vehicle interior is formed in the cover panel, and
a peripheral portion of an opening part of the second article storage part is fixed to the reinforcement.

3. The instrument panel according to claim 2, wherein
the cover panel includes:
an upper wall;
a back wall extending downward from an end portion, on a side opposite to the inner side of the vehicle interior, of the upper wall; and
a standing wall standing upward from an end portion, on the inner side of the vehicle interior, of the upper wall,
wherein the upper wall is provided with a surrounding wall standing upward from the upper wall,
the upper wall, the surrounding wall, and the standing wall form the second article storage part, and
the opening part of the second article storage part is formed in the standing wall.

4. The instrument panel according to claim 3, wherein
a pair of the brackets are arranged at an interval in a vehicle width direction and extend from the steering member, and
two end portions, in the vehicle width direction, of the back wall are respectively fixed to the pair of brackets.

5. The instrument panel according to claim 3, wherein
the cover panel includes sidewalls respectively extending downward from two end portions, in the vehicle width direction, of the upper wall,
a space is formed between the back wall and each of the sidewalls,
lower end portions of the sidewalls are respectively connected to lower end portions of the end portions, in the vehicle width direction, of the back wall through connection pieces, and
the sidewalls are set thinner than the upper wall.

6. The instrument panel according to claim 1, wherein
the reinforcement is in the form of a crank having a curved middle portion in a longitudinal direction thereof,
one of a pair of reinforcing portions located on both sides of the curved middle portion, in the longitudinal direction, of the reinforcement is fixed to one of a pair of right and left upper end portions of the opening part, which are partitioned in the vehicle width direction,
the other reinforcing portion is located inside the instrument panel body behind the one reinforcing portion,
an end portion, on a side opposite to the curved portion, of the other reinforcing portion is fixed to the corresponding side portion of the opening part, and
a drawer-type cup holder is fixed to the other upper end portion of the opening part and to the other reinforcing portion.

7. The instrument panel according to claim 6, wherein
the cup holder includes:
a container holder; and
a case for storing the container holder in such a manner that the container holder is freely let into and out of the case,
wherein an upper flange protrudes upward from a front end portion, on the inner side of the vehicle interior, of the case, while a lower flange protrudes downward from a lower wall of the case,
the upper flange is fixed to the other upper end portion of the opening part, and
the lower flange is fixed to the other reinforcing portion.

* * * * *